US011417315B2

(12) United States Patent
Liu

(10) Patent No.: US 11,417,315 B2
(45) Date of Patent: Aug. 16, 2022

(54) INFORMATION PROCESSING APPARATUS AND INFORMATION PROCESSING METHOD AND COMPUTER-READABLE STORAGE MEDIUM

(71) Applicant: Sony Corporation, Tokyo (JP)

(72) Inventor: Yi Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 27 days.

(21) Appl. No.: 16/892,326

(22) Filed: Jun. 4, 2020

(65) Prior Publication Data

US 2020/0410982 A1 Dec. 31, 2020

(30) Foreign Application Priority Data

Jun. 26, 2019 (CN) ........................ 201910560709.X

(51) Int. Cl.
*G06F 3/16* (2006.01)
*G10L 13/08* (2013.01)

(52) U.S. Cl.
CPC .................................... *G10L 13/08* (2013.01)

(58) Field of Classification Search
None
See application file for complete search history.

(56) References Cited

U.S. PATENT DOCUMENTS

| | | | | |
|---|---|---|---|---|
| 6,538,666 | B1 * | 3/2003 | Ozawa | G06F 3/16 704/E15.04 |
| 8,932,131 | B2 * | 1/2015 | Lutnick | G07F 17/3218 463/29 |
| 10,425,762 | B1 * | 9/2019 | Schissler | H04S 7/303 |
| 2003/0155413 | A1 * | 8/2003 | Kovesdi | G06F 16/954 235/375 |
| 2005/0108646 | A1 * | 5/2005 | Willins | G01S 3/803 715/723 |
| 2005/0203748 | A1 * | 9/2005 | Levas | G06F 16/353 704/275 |
| 2010/0035686 | A1 * | 2/2010 | Nakashima | A63F 13/424 463/36 |
| 2010/0150360 | A1 * | 6/2010 | Beaucoup | H04R 3/005 381/94.1 |
| 2011/0081968 | A1 * | 4/2011 | Mar | A63F 13/54 463/37 |
| 2012/0155654 | A1 * | 6/2012 | Sidhu | H04R 5/04 381/28 |

(Continued)

*Primary Examiner* — Jakieda R Jackson
(74) *Attorney, Agent, or Firm* — Xsensus LLP

(57) ABSTRACT

An information processing apparatus and an information processing method as well as a computer readable storage medium are provided. The information processing apparatus includes a processing circuitry configured to: select, from a sound, sound elements which are related to scene features during making of the sound; establish a correspondence relationship including a first correspondence relationship between the scene features and the sound elements and between the respective sound elements, and store the scene features and the sound elements as well as the correspondence relationship in association in a correspondence relationship library; and generate, based on a reproduction scene feature and the correspondence relationship library, a sound to be reproduced.

10 Claims, 4 Drawing Sheets

(56) References Cited

U.S. PATENT DOCUMENTS

| | | | | |
|---|---|---|---|---|
| 2013/0041648 | A1* | 2/2013 | Osman | H04S 7/304<br>704/2 |
| 2013/0169626 | A1* | 7/2013 | Balan | G06F 3/0304<br>345/419 |
| 2013/0272548 | A1* | 10/2013 | Visser | G06V 10/454<br>382/103 |
| 2014/0133683 | A1* | 5/2014 | Robinson | H04S 7/30<br>381/303 |
| 2015/0156578 | A1* | 6/2015 | Alexandridis | H04R 3/005<br>381/92 |
| 2015/0287422 | A1* | 10/2015 | Short | G01S 3/74<br>704/211 |
| 2017/0265014 | A1* | 9/2017 | Shintani | H04S 7/302 |
| 2017/0295446 | A1* | 10/2017 | Thagadur Shivappa | H04S 7/304 |
| 2017/0359666 | A1* | 12/2017 | Lyren | G10L 25/81 |
| 2018/0027351 | A1* | 1/2018 | Cartwright | H04S 7/303<br>381/303 |
| 2018/0046431 | A1* | 2/2018 | Thagadur Shivappa | G06F 3/012 |
| 2018/0324539 | A1* | 11/2018 | Lovitt | G06T 19/006 |
| 2018/0332424 | A1* | 11/2018 | Edry | H04S 5/005 |
| 2019/0102141 | A1* | 4/2019 | Li | G06F 3/167 |
| 2019/0197196 | A1* | 6/2019 | Yang | G02B 27/017 |
| 2019/0253812 | A1* | 8/2019 | Gallégo | A61B 5/398 |
| 2019/0378385 | A1* | 12/2019 | Biggs | H04R 1/1091 |
| 2020/0151601 | A1* | 5/2020 | Niewczas | H04L 63/0428 |
| 2020/0236487 | A1* | 7/2020 | Kratz | H04S 7/303 |

* cited by examiner

INFORMATION PROCESSING APPARATUS AND INFORMATION PROCESSING METHOD AND COMPUTER-READABLE STORAGE MEDIUM

CROSS-REFERENCE TO RELATED APPLICATION

The present application claims priority to CN 201910560709.X, filed Jun. 26, 2019, the entire contents of which are incorporated herein by reference.

FIELD

The present application relates to the field of information processing, and in particular to an information processing apparatus and an information processing method capable of generating a customized personalized sound, and a corresponding computer readable storage medium.

BACKGROUND

In the conventional audio production technology, audio files can only be produced by using voice contents inherent in a system, resulting in that a user feels boring. For example, in the scenario of a game platform, a game commentary can only be realized by using a pre-recorded commentary audio file in the game, resulting in that a player feels boring.

SUMMARY

The brief summary of the present disclosure is given hereinafter, so as to provide basic understanding on some aspects of the present disclosure. It should be understood that, the summary is not exhaustive summary of the present disclosure. The summary is neither intended to determine key or important parts of the present disclosure, nor intended to limit the scope of the present disclosure. An object of the present disclosure is to provide some concepts in a simplified form, as preamble of the detailed description later.

According to an aspect of the present application, there is provided an information processing apparatus, including: a processing circuitry configured to: select, from a sound, sound elements which are related to scene features during making of the sound; establish a correspondence relationship including a first correspondence relationship between the scene features and the sound elements and between the respective sound elements, and store the scene features and the sound elements as well as the correspondence relationship in association in a correspondence relationship library; and generate, based on a reproduction scene feature and the correspondence relationship library, a sound to be reproduced.

According to another aspect of the present application, there is provided an information processing method, including: selecting, from a sound, sound elements which are related to scene features during making of the sound; establishing a correspondence relationship including a first correspondence relationship between the scene features and the sound elements and between the respective sound elements, and storing the scene features and the sound elements as well as the correspondence relationship in association in a correspondence relationship library; and generating, based on a reproduction scene feature and the correspondence relationship library, a sound to be reproduced.

According to another aspect of the present application, there is provided an information processing device, including: a manipulation apparatus for a user to manipulate the information processing device; a processor; and a memory including instructions readable by the processor, and the instructions, when being read by the processor, causing the information processing device to execute the processing of: selecting, from a sound, sound elements which are related to scene features during making of the sound; establishing a correspondence relationship including a first correspondence relationship between the scene features and the sound elements and between the respective sound elements, and storing the scene features and the sound elements as well as the correspondence relationship in association in a correspondence relationship library; and generating, based on a reproduction scene feature and the correspondence relationship library, a sound to be reproduced.

According to other aspects of the present disclosure, there are further provided computer program codes and a computer program product for implementing the information processing method descried above, and a computer readable storage medium in which the computer program codes for implementing the information processing method descried above are recorded.

These and other advantages of the present disclosure will become clearer from the following detailed description of preferred embodiments of the present disclosure in conjunction with the drawings.

BRIEF DESCRIPTION OF THE DRAWINGS

To further set forth the above and other advantages and features of the present disclosure, detailed description of the embodiments of the present disclosure is provided in the following in conjunction with accompanying drawings. The accompanying drawings, together with the detailed description below, are incorporated into and form a part of the specification. The element with the same function and structure is indicated with the same reference numeral. It should be understood that the accompanying drawings only illustrate typical embodiments of the present disclosure and should not be construed as a limitation to the scope of the present disclosure. In the drawings.

DETAILED DESCRIPTION

Figure 1:
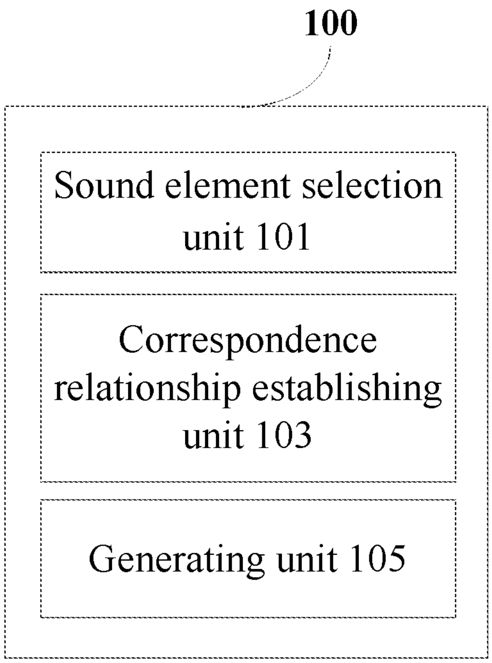
FIG. 1 illustrates a block diagram of functional modules of an information processing apparatus according to an embodiment of the present disclosure.

Exemplary embodiments of the present disclosure are described below in conjunction with the accompanying drawings. For clarity and conciseness, not all the features of an actual embodiment are described in the specification. However, it is to be appreciated that numerous implementation-specific decisions shall be made during developing any of such practical implementations so as to achieve specific targets of the developer, for example, to comply with constraining conditions related to system and business, which may change for different implementations. Furthermore, it should also be understood that although the development work may be complicated and time-consuming, for those skilled in the art benefiting from the present disclosure, such development work is only a routine task.

Here, it shall further be noted that in order to avoid obscuring the present disclosure due to unnecessary details, only a device structure and/or process steps closely relevant to the solutions of the present disclosure are illustrated in the drawings while other details less relevant to the present disclosure are omitted.

FIG. 1 illustrates a block diagram of functional modules of an information processing apparatus 100 according to an embodiment of the present disclosure. As shown in FIG. 1, the information processing apparatus 100 includes a sound element selection unit 101, a correspondence relationship establishing unit 103, and a generating unit 105.

The sound element selection unit 101, the correspondence relationship establishing unit 103, and the generating unit 105 may be implemented by one or more processing circuitries. The processing circuitry may be implemented as for example a chip, and a processor. In addition, it should be understood that function units shown in FIG. 1 merely represent logical modules that are divided according to specific functions implemented by the function units, and the division manner is not intended to limit the specific implementations.

For ease of description, the information processing apparatus 100 according to an embodiment of the present disclosure is described below by taking an application scenario of a game entertainment platform as an example. However, the information processing apparatus 100 according to the embodiment of the present disclosure can be applied to not only a game entertainment platform but also a live television sports contest, a documentary or other audio and video products with aside.

The sound element selection unit 101 may be configured to select, from a sound, sound elements which are related to scene features during making of the sound.

As an example, the sound includes voice of a speaker (e.g., voice of a game player). As an example, the sound may further include at least one of applause, acclaim, cheer, and music.

As an example, the sound element selection unit 101 may perform sound processing on an external sound collected in real time during the game system startup and during the game, thereby recognizing the voice of the game player, for example, recognizing a comment of the game player during the game. The sound element selection unit 101 may further recognize sound information, such as applause, acclaim, cheer, and music by sound processing.

As an example, the scene features include at least one of game content, game character name (e.g., player name), motion in a game, game or contest property, real-time game scene, and game scene description. As can be seen, the scene features may include various characteristics or attributes related to the scene to which the sound is related.

As an example, the sound elements include information for describing scene features and/or information for expressing an emotion. The information for expressing the emotion includes a tone of the sound and/or a rhythm of the sound.

As an example, the sound element selection unit 101 performs a comparative analysis on the sound according to a predetermined rule to select sound elements in the sound which are related to the scene features during making of the sound. At least a correspondence between sound elements and scene features, and a correspondence between the respective sound elements are specified according to the predetermined rule. For example, the predetermined rule may be designed with reference to at least a portion of the original voice commentary information of the game. For example, the predetermined rule may be designed by clipping the sound and converting the sound into text, and then performing a semantic analysis. For example, if it is determined that the name "Messi" is a name of a new player, the sound element "Messi" may be recorded and the scene feature corresponding to the sound element is marked as "player name". Further, more sound elements and scene features may be recorded according to a context. For example, for the voice "Messi's shooting is amazing", the following recording is performed. The sound element "shooting" corresponds to the scene feature "game action". Because determination for Messi is usually related to the shooting, the correspondence between the sound element "Messi" and "shooting" is also recorded (in this example, "Messi" is a subject, and "shooting" is an action; therefore, the correspondence between "Messi" and "shooting" is the subject+action). The above recorded information serves as the predetermined rule. As an example, a correspondence between sound elements may be specified according to a grammatical model (e.g., "subject+predicate", "subject+ predicate +object", "subject+attributive", "subject+adverbial", et al.).

As an example, the sound element selection unit 101 filters out sound elements in the sound which are not related to scene features during making of the sound.

As an example, the sound element selection unit 101 may be deployed locally in the game device or may be implemented using cloud platform resources.

As can be seen from the above description, the sound element selection unit 101 can analyze, identify and finally select valid sound elements.

The correspondence relationship establishing unit 103 may be configured to establish a correspondence relationship including a first correspondence relationship between the scene features and the sound elements and between the respective sound elements, and store the scene features and the sound elements as well as the correspondence relationship in association in a correspondence relationship library.

The correspondence relationship establishing unit 103 marks the sound elements selected by the sound element selection unit 101 and scene features corresponding to the sound elements, and, establishes the correspondence relationship between scene features and sound elements and between the respective sound elements by for example machine learning (for example, a neural network), with reference to the above predetermined rule. Taking the voice "C Ronaldo scores really wonderful" as an example, the correspondence relationship establishing unit 103 establishes a correspondence relationship between the sound element "C Ronaldo" and the scene feature "player name", and establishes a correspondence relationship between "score" and scene feature "game action". The correspondence relationship between the sound element "C Ronaldo" and the sound element "shooting" is also established because it is determined by machine learning that C Ronaldo is usually related to a score. If the scene features and sound elements above are not stored in the correspondence relationship library, the scene features, sound elements and the correspondence relationship above are stored in association in the correspondence relationship library.

In addition, the above predetermined rules may also be stored in the correspondence relationship library. As sound elements and scene features in the correspondence relationship library increase, the correspondence between sound elements and scene features, and the correspondence between respective sound elements become increasingly complicated. The predetermined rules are updated in response to updating of the correspondence between the sound elements and the scene features and the correspondence between the respective sound elements.

As an example, the correspondence relationship library can be continuously expanded and improved through machine learning (for example, a neural network).

The correspondence relationship library may be stored locally or in a remote platform (cyberspace or cloud storage space).

The correspondence relationship may be stored in the form of a correspondence relationship matrix, a mapping diagram, or the like.

The generating unit 105 may be configured to generate, based on a reproduction scene feature and the correspondence relationship library, a sound to be reproduced. Specifically, the generating unit 105 may generate, based on the reproduction scene feature and the correspondence relationship library, a sound to be reproduced according to a correspondence relationship between the scene features and the sound elements and a correspondence relationship between the respective sound elements in the correspondence relationship library. As the scene features, sound elements, and correspondence relationships in the correspondence relationship library are continuously updated, the sound to be reproduced is continuously updated, optimized, and enriched. As an example, in response to triggering of a scene with a reproduction scene feature in a game, the generating unit 105 can generate a new game commentary audio information file according to the voice of the player stored in the correspondence relationship library, and the file includes comments of the game player during the game, so that the game commentary audio information is more personalized, thereby forming a unique audio commentary information file for the game player. This personalized audio commentary information can be shared through the platform, thereby improving the convenience of information interaction.

As an example, the generating unit 105 may store the generated sound to be reproduced in the form of a file (e.g., an audio commentary information file) locally or in an exclusive area in a remote platform (cyberspace or cloud storage space). In addition, the file is displayed in a custom manner (for example, in Chinese, English, and Japanese) in the UI of the game system for the game player to choose and use.

As can be seen from the above description, the information processing apparatus 100 according to the embodiment of the present disclosure can generate, based on reproduction scene feature, a customized personalized sound according to the correspondence relationship between the scene features and the sound elements and between the respective sound elements in the correspondence relationship library. Therefore, the defect that an audio file is created only by using pre-recorded sound contents inherent in a system in the conventional audio production technology is overcome. For the game entertainment platform, the existing game commentary is single and monotonous. The information processing apparatus 100 according to the embodiment of the present disclosure can generate a customized personalized game commentary based on the voice of the player stored in the correspondence relationship library.

Preferably, the information processing apparatus 100 according to the embodiment of the present disclosure may further include a sound acquisition unit configured to collect a sound via sound acquisition devices. Currently, the general game system platform does not include external sound acquisition devices and does not have corresponding functions. In the sound acquisition unit according to the embodiment of the present disclosure, a recording function is realized through peripheral devices. The sound acquisition devices may be installed, for example, in a gamepad, a mouse, a camera device, a PS Move, a headphone, a computer, or a display device such as a television.

Preferably, the sound acquisition unit may collect a sound of each speaker via sound acquisition devices which are respectively arranged corresponding to each speaker, and may distinguish the collected sounds of different speakers according to IDs of the sound acquisition devices. Preferably, the IDs of the sound acquisition devices may be included in the correspondence relationship library. For example, when multiple persons participate in a game at the same time, voices of multiple game players may be simultaneously recorded by a microphone of each gamepad and/or a microphone of other peripheral devices for the game, and voices of different players can be distinguished by IDs of the microphones. Preferably, the IDs of the microphones may also be included in the correspondence relationship library. For example, player A and friend B play a football game at the same time, and the sound acquisition unit simultaneously collects voices of player A and friend B via the microphones of player A and friend B, and distinguishes the voices of player A and friend B by the IDs of the microphones.

Preferably, the sound acquisition unit may concentratedly collect a sound of each speaker via one sound acquisition device, and may distinguish collected sounds of different speakers according to location information and/or sound ray information of the speakers. In addition, the above location information may be stored for future use for other applications, such as 3D audio rendering et al. Preferably, the above location information may also be included in the correspondence relationship library. For example, player A invites friends B and C to play a football game, and each time two persons play the game at the same time and one person watches the game. The sound acquisition unit can concentratedly collect voices of the player A and friends B and C via one microphone, and can distinguish voices of the player A and friends B and C according to the location information and/or the sound ray information of the player A and friends B and C.

The above two sound acquisition schemes (i.e., collecting a sound of each speaker via the respective sound acquisition device of each speaker and collecting a sound of each speaker via a centralized sound acquisition device) may be used separately or simultaneously. For example, voices of a part of the speakers are collected by respective sound acquisition devices, and voices of another part of the speakers are collected by a centralized sound acquisition device. Alternatively, the respective sound acquisition device and the centralized sound acquisition device may be provided, and the sound acquisition scheme is selected depending on actual situations.

Preferably, the sound acquisition unit may collect a sound of each speaker via a sound acquisition device, and distinguish sounds of different speakers by performing a sound ray analysis on the collected sounds. As an example, during the game, the sound acquisition unit may concentratedly collect voices of the player A and friends B and C via one microphone or may separately collect voices of three persons A, B, and C via the microphones of the persons A, B, and C; and performs a sound ray analysis on the collected voices, thereby identifying voices of player A and friends B, C. As an example, the system may record real-time location information of the game player (e.g., a location of the game player relative to a gamepad or a host). The location of the same game player relative to the gamepad may change during the acquisition of the audio, resulting in different collected sound effects. This location information is beneficial in eliminating the sound difference caused by different location of the sound, so that voices of different players can be more accurately identified.

Preferably, the correspondence relationship further includes a second correspondence relationship between the sound and the scene features as well as the sound elements. For example, the correspondence relationship may further include a second correspondence relationship between a complete sound and the scene features as well as sound elements. Taking the complete voice "Messi's shooting is amazing" as an example, the correspondence relationship may further include a second correspondence relationship between the complete voice "Messi's shooting is amazing" and the scene features "player name" and "game action" as well as the sound elements "Messi" and "shooting". Preferably, the correspondence relationship establishing unit 103 is configured to store the complete sound in association with the scene features and the sound elements as well as the second correspondence relationship in the correspondence relationship library, and the generating unit 105 is configured to search the correspondence relationship library for the complete sound or sound elements related to the reproduction scene feature according to the correspondence relationship, and generate the sound to be reproduced using the found complete sound or sound elements. As an example, if the complete sound above is not stored in the correspondence relationship library, the complete sound is stored in association with the scene features and the sound elements as well as the second correspondence relationship in the correspondence relationship library. As an example, the generating unit 105 dynamically and intelligently finds a sound or sound elements from the correspondence relationship library. For example, in the case where there are multiple complete sounds or multiple combinations of sound elements which are related to reproduction scene feature in the correspondence relationship library, one complete sound is dynamically and intelligently selected from the multiple complete sounds, or one combination of sound elements is dynamically and intelligently selected from the multiple combinations of sound elements. A sound to be reproduced is generated using the selected complete sound or combination of sound elements.

The sound to be reproduced is generated by using the found complete sound or sound elements, so that the content of the sound to be reproduced can be enriched, thereby generating a personalized voice.

For the sake of brevity, the "complete sound" is sometimes referred to as "sound" hereinafter.

As an example, the correspondence relationship establishing unit 103 periodically analyzes the use of the sound elements and the scene features stored in the correspondence relationship library during the generation of the sound to be reproduced. If there are sound elements and scene features in the correspondence relationship library that are not used to generate a sound to be reproduced for a long time period, these sound elements and scene features are determined as invalid information. Thus, the sound elements and scene features are deleted from the correspondence relationship library, thereby saving a storage space and improving processing efficiency. For example, the correspondence relationship establishing unit 103 deletes the complete sound, from the correspondence relationship library, that is not used to generate a sound to be reproduced for a long time period.

Preferably, the correspondence relationship further includes a third correspondence relationship between the ID information of the speaker uttering the sound and the scene features as well as the sound elements. The correspondence relationship establishing unit 103 may be configured to store the ID information of the speaker in association with the scene features and the sound elements as well as the third correspondence relationship in the correspondence relationship library. The generating unit 105 can determine which speaker to which the found sound elements belong, based on the third correspondence relationship between the ID information of the speaker and the scene features and the sound elements. Therefore, the generating unit 105 can generate a sound to be reproduced including the complete sound or sound elements of the desired speaker, thereby improving the user experience.

Although the first correspondence relationship, the second correspondence relationship, and the third correspondence relationship are described above, the correspondence relationship described in the present disclosure is not limited to include only the first correspondence relationship, the second correspondence relationship, and the third correspondence relationship. Other correspondence relationships may be generated during the analysis and processing of sounds, sound elements, and scene features. The correspondence relationship establishing unit 103 may be configured to store other correspondence relationships in the correspondence relationship library.

Preferably, the generating unit 105 may be configured to: search for, in a case where a reproduction scene feature fully matches the scene feature in the correspondence relationship library, a complete sound which is related to the scene feature fully matching the reproduction scene feature, and generate the sound to be reproduced using the found complete sound. The sound to be reproduced is generated using the found complete sound, thereby generating a sound that completely corresponds to the reproduction scene feature.

As an example, in a case where the reproduction scene feature fully matches the scene feature that corresponds to the voice of "Messi's shooting is amazing", the generating unit 105 can find the complete voice of "Messi's shooting is amazing" from the correspondence relationship library, and generate the sound to be reproduced using the found complete voice of "Messi's shooting is amazing".

Preferably, the sound is a voice of a speaker. The generating unit 105 may be configured to add the found complete sound in a form of text or audio into a sound information library of an original speaker (for example, an original commentator for the game), and generate the sound to be reproduced based on the sound information library, to render the sound to be reproduced according to a pronunciation sound ray of the original speaker, thereby increasing the flexibility of the commentary audio synthesis. In this way, the generating unit 105 adds the found complete sound into the sound information library of the original speaker, to continuously enrich and expand the sound information library of the original speaker. As an example, the generating unit 105 can combine the found complete sound with the voice in the sound information library of the original speaker, and synthesize the sound to be reproduced according to the pronunciation sound ray of the original speaker. For the game entertainment platform, in response to triggering of the real-time scene of the game, the generating unit 105 can synthesize the found complete voice of the player with the original commentary according to the pronunciation sound ray of the original commentator for the game, as a part of a new game commentary audio.

Preferably, the generating unit 105 may be configured to generate a sound to be reproduced using the found complete sound in the form of text or audio, to render the sound to be reproduced according to a pronunciation sound ray of a speaker uttering the found complete sound, thereby presenting the tone and rhythm of the found sounds as realistic as possible. In this way, the generating unit 105 directly stores the found complete sound as a voice file. As an example, the generating unit 105 can generate the sound to be reproduced by directly using the found complete voice according to the pronunciation sound ray of the speaker uttering the found complete voice. For the game entertainment platform, in response to triggering of the real-time scene of the game, the generating unit 105 can synthesize the found complete voice of the player according to the pronunciation sound ray of the player uttering the found sound, as a part of a new game commentary audio.

Preferably, the generating unit 105 may be configured to: search for, in a case where the reproduction scene feature does not fully match any of the scene features in the correspondence relationship library, sound elements related to scene features which respectively match respective portions of the reproduction scene feature, and generate the sound to be reproduced by combining the found sound elements. As an example, the generating unit 105 divides the reproduction scene feature into different portions, finds from the correspondence relationship library the scene features which respectively match respective portions of the reproduction scene feature, finds the sound elements "Messi", "shooting", "amazing", which are respectively related to the matched scene features, and finally generates the sound to be reproduced of "Messi's shooting is amazing" by combining the found sound elements. A sound to be reproduced corresponding to the reproduction scene feature can be generated by combining the found sound elements related to the reproduction scene feature.

Preferably, the sound is the voice of a speaker. The generating unit 105 may be configured to add the found sound elements in a form of text or audio into a sound information library of an original speaker, and generate the sound to be reproduced based on the sound information library, to render the sound to be reproduced according to a pronunciation sound ray of the original speaker, thereby increasing the flexibility of the commentary audio synthesis. In this way, the generating unit 105 adds the found sound elements into the sound information library of the original speaker, to continuously enrich and expand the sound information library of the original speaker. As an example, the generating unit 105 can combine the found sound element with the voice in the sound information library of the original speaker, and synthesize the sound to be reproduced according to pronunciation sound ray of the original speaker. For the game entertainment platform, in response to triggering of the real-time scene of the game, the generating unit 105 can synthesize the found sound elements of a player with the original commentary according to the pronunciation sound ray of the original commentator for the game, as a part of a new game commentary audio.

Preferably, the generating unit 105 may be configured to generate a sound to be reproduced using the found sound element, to render the sound to be reproduced according to a pronunciation sound ray of the speaker uttering the found sound element, thereby increasing a participation sense of the speaker. In this way, the generating unit 105 directly stores the combination of the found sound elements as a voice file. As an example, the generating unit 105 can generate a sound to be reproduced from the combination of the found sound elements, according to the pronunciation sound ray of the speaker uttering the found voice. For the game entertainment platform, in response to triggering of the real-time scene of the game, the generating unit 105 can synthesize the combination of the found voice of the player according to the pronunciation sound ray of the player uttering the found sound, as a part of a new game commentary audio.

As an example, in a case where each portion of the reproduction scene feature does not match any of the scene features in the correspondence relationship library, the sound elements which are related to the scene features in the correspondence relationship library having a high similarity with the reproduction scene feature can be selected according to the similarity degree between the reproduction scene feature and the scene features in the correspondence relationship library, to synthesize the sound to be reproduced.

Preferably, the generating unit 105 can add the found complete sound or sound element in a form of a sound barrage to the sound, to generate a sound to be reproduced. As an example, in a case that collected information is not rich enough in an initial stage of collecting audio information of the player, the found complete voice or sound element of the game player can be added in the form of a "sound barrage" to the original commentary audio, to form unique audio rendering. In this case, the original commentary audio remains unchanged, and only in certain scenes (such as, scores, fouls, showing red or yellow card et al.), the found complete voice or sound element of the game player is played in the form of "sound barrage" during the game, thereby enriching the forms for reproducing the audio commentary.

The sound to be reproduced generated according to the above processing may be played or reproduced immediately after being generated, or may be buffered for later playing or reproduction as needed.

Preferably, the information processing apparatus 100 according to the embodiment of the present disclosure further includes a reproduction unit (not shown in the figure). The reproduction unit may be configured to reproduce the sound to be reproduced in a scenario containing the reproduction scene feature. As an example, the reproduction unit can analyze a real-time scene of a game in real time according to the original design logic of the game, and trigger the sound to be reproduced (for example, the game commentary audio information file generated according to the above processing) in the scenario containing the reproduction scene feature. As the voice information collected by the sound acquisition unit increases and enriches continuously, the design logic of the game can be continuously optimized to reproduce the more accurate and richer sounds to be reproduced (for example, the game commentary audio information file generated according to the above processing) that are generated according to the real-time scene of the game. Therefore, the reproduction unit can present the sound to be reproduced more user-friendly.

Preferably, the reproduction unit may render the sound to be reproduced according to the pronunciation sound ray of the original speaker. Specifically, the reproduction unit may analyze the scene of the game in real time according to the original design logic of the game. In a case where the generating unit 105 adds the found sound element or the complete sound into the sound information library of the original speaker as described above, the reproduction unit presents the sound to be reproduced according to the pronunciation sound ray of the original speaker, so that the original commentary content information is continuously enriched and expanded, and the commentary content has personalized features. In addition, the addition of new sound elements and scene features into the correspondence relationship library changes or finely enriches the triggering logic and design of the original commentary audio of the game.

Preferably, the reproduction unit may render the sound to be reproduced according to the pronunciation sound ray of the speaker uttering the found sound elements or complete sound. Specifically, in the case where the generating unit 105 directly stores the combination of the found sound elements or the complete sound as a voice file as described above, the reproduction unit reproduces the sound to be reproduced according to the pronunciation sound ray of the speaker uttering the found sound elements or complete sound. For example, in the case where the sound elements or the complete voice of the game player is found, the reproduction unit can present the game commentary audio according to the sound ray of player based on the original design logic of the game in combination with the real-time scene of the game. The increasing of sound elements and scene features increases the triggering of the game scene, so that the commentary audio information can be more accurately and vividly presented. In addition, the original commentary audio included in the game can be rendered with the sound ray of the game player, especially when the sound information of the player is not rich enough initially.

Preferably, the information processing apparatus 100 according to the embodiment of the present disclosure further includes a communication unit (not shown in the figure). The communication unit may be configured to communicate with an external device or a network platform in a wireless or wired manner to transmit information to the external device or the network platform. For example, the communication unit may transmit the sound to be reproduced generated by the generating unit 105 in the form of a file to the network platform, thereby facilitating sharing between users.

The information processing apparatus 100 according to the embodiment of the present disclosure is described above by assuming that an application scenario is a game platform, especially sports game (E-Sports). However, the information processing apparatus 100 according to the embodiment of the present disclosure may also be applied to other similar application scenarios.

As an example, the information processing apparatus 100 according to the embodiment of the present disclosure is also applicable to an application scenario of a live television sports contest. In this application scenario, the information processing apparatus 100 collects the sound information of a broadcaster in real time, performs a detailed analysis, and stores the relevant complete sound and/or sound elements, scene features, and the correspondence relationship therebetween, to automatically generate the commentary sound for the real-time scene of the future contest uttered according to the sound ray of the broadcaster, thereby realizing "automatic commentary".

As an example, the information processing apparatus 100 according to the embodiment of the present disclosure can realize "automatic realized aside" in a documentary or other audio and video products with aside. Specifically, the commentary sound of a famous announcer is recorded, a voice analysis is performed and the relevant complete sound and/or sound elements, scene features, and the correspondence relationship therebetween are stored, so that the commentary sound for the real-time scene uttered according to the recorded sound ray of the announcer can be automatically generated in other documentaries, thereby realizing the generation and playing of the "automatic aside".

Figure 2:
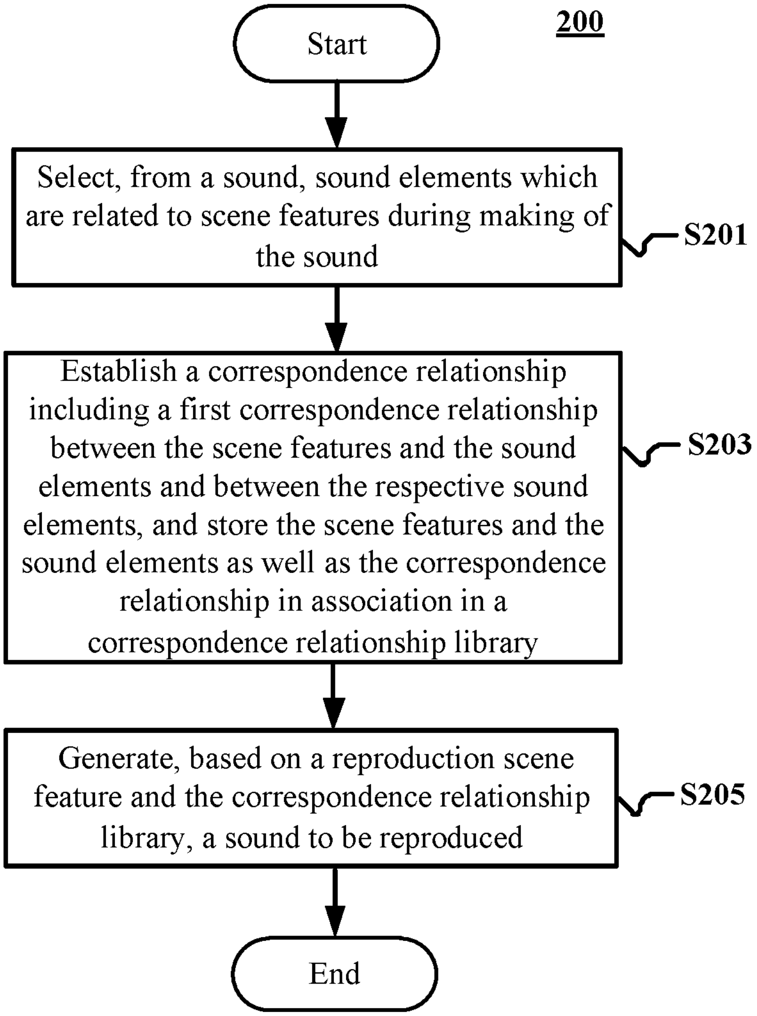
FIG. 2 is a flowchart illustrating a process example of an information processing method according to an embodiment of the present disclosure.

Corresponding to the above embodiment of the information processing apparatus, an embodiment of an information processing method is further provided according to the present disclosure. FIG. 2 is a flowchart illustrating a process example of an information processing method according to an embodiment of the present disclosure. As shown in FIG. 2, the information processing method 200 according the an embodiment of the present disclosure includes a sound element selecting step S201, a correspondence relationship establishing step S203, and a generating step S205.

In the sound element selecting step S201, sound elements which are related to the scene features during making of the sound are selected from a sound.

As an example, the sound includes a voice of a speaker (e.g., a voice of a game player). As an example, the sound may further include at least one of applause, acclaim, cheer and music et al.

As an example, in the sound element selecting step S201, an external sound collected in real time during a game system startup and during a game is processed, thereby recognizing a voice of a game player, for example, recognizing a comment of the game player during the game. In the sound element selecting step S201, sound information such as applause, acclaim, cheer, and music et al may be recognized by sound processing.

As an example, the scene features include at least one of game content, game character name (e.g., player name), motion in a game, game or contest property, real-time game scene, and game scene description. As can be seen, the scene features may include various characteristics or attributes related to the scene to which the sound is related.

As an example, the sound elements include information for describing scene features and/or information for expressing an emotion. The information for expressing the emotion includes a tone of the sound and/or a rhythm of the sound.

As an example, in sound element selecting step S201, a comparative analysis is performed on the sound according to a predetermined rule to select sound elements in the sound which are related to the scene features during making of the sound. At least a correspondence between sound elements and scene features, and a correspondence between the respective sound elements are specified according to the predetermined rule.

For an example of the predetermined rule, one may refer to the description about the sound element selection unit 101 in the embodiment of the information processing apparatus above, and details are not repeated here.

As an example, in sound element selecting step S201, the sound elements in the sound which are not related to the scene features during the making of the sound are filtered out.

As can be seen from the above description, in sound element selecting step S201, valid sound elements can be analyzed and identified and finally selected.

In the correspondence relationship establishing step S203, a correspondence relationship including a first correspondence relationship between the scene features and the sound elements and between the respective sound elements is established, and the scene features and the sound elements as well as the correspondence relationship are stored in association in a correspondence relationship library.

In the correspondence relationship establishing step S203, the sound elements selected in the sound element selecting step S201 and scene features corresponding to the sound elements are marked, and a correspondence relationship between scene features and sound elements, and between respective sound elements is established by for example, machine learning (for example, a neural network) with reference to the above predetermined rules. If the scene features and the sound elements are not stored in the correspondence relationship library, the scene features, the sound elements and the correspondence relationship are stored in association in the correspondence relationship library.

For an example of establishing a correspondence relationship, one may refer to the description about the correspondence relationship establishing unit 103 in the embodiment of the information processing apparatus above, and details are not repeated here.

In addition, the above predetermined rule may also be stored in the correspondence relationship library. As sound elements and scene features stored in the correspondence relationship library increases, the correspondence between sound elements and scene features, and the correspondence between respective sound elements become increasingly complicated. The predetermined rule is updated in response to updating of the correspondence between the sound elements and the scene features and the correspondence between the respective sound elements.

As an example, the correspondence relationship library can be continuously expanded and improved through machine learning (for example, a neural network).

The correspondence relationship library may be stored locally or in a remote platform (cyberspace or cloud storage space).

The correspondence relationship may be stored in the form of a correspondence relationship matrix, a mapping diagram, or the like.

In generating step S205, a sound to be reproduced is generated based on the reproduction scene feature and the correspondence relationship library. Specifically, in the generating step S205, the sound to be reproduced is generated based on the reproduction scene feature and the correspondence relationship library, according to a correspondence relationship between the scene features and the sound elements and between the respective sound elements in the correspondence relationship library. As the scene features, sound elements, and correspondence relationship in the correspondence relationship library are continuously updated, the sound to be reproduced is continuously updated, optimized, and enriched. As an example, in response to triggering of a scene with a reproduction scene feature in a game, in generating step S205, a new game commentary audio information file is generated according to the voice of the player stored in the correspondence relationship library, and the file includes comment of the game player during the game, so that the game commentary audio information is more personalized, thereby generating a unique audio commentary information file for the game player. This personalized audio commentary information can be shared through the platform, thereby increasing the convenience of information interaction.

As an example, in generating step S205, the generated sound to be reproduced is stored in the form of a file (e.g., an audio commentary information file) locally or in an exclusive area in a remote platform (cyberspace or cloud storage space). In addition, the file is presented in a customized way (for example, in Chinese, English, and Japanese) in the UI of the game system for the game player to choose and use.

As can be seen from the above description, with the information processing method 200 according to the embodiment of the present disclosure, a customized personalized sound can be generated, based on reproduction scene feature, according to the correspondence relationship between the scene features and the sound elements and between the respective sound elements in the correspondence relationship library. Accordingly, the defect that an audio file is created only by using pre-recorded sound contents inherent in a system in the conventional audio production technology is overcome. For the game entertainment platform, the existing game commentary is single and monotonous. With the information processing method 200 according to the embodiment of the present disclosure, a customized personalized game commentary can be generated based on the voice of the player stored in the correspondence relationship library.

Preferably, the information processing method 200 according to the embodiment of the present disclosure may further include a sound acquisition step. In sound acquisition step, a sound is collected via the sound acquisition device. The sound acquisition device may be installed, for example, in a game pad, a mouse, a camera device, a PS Move, a headphone, a computer, or a display device such as a television.

Preferably, in sound acquisition step, a sound of each speaker is collected via sound acquisition devices which are respectively arranged corresponding to each speaker, and the collected sounds of different speakers are distinguished according to IDs of the sound acquisition devices. Preferably, the IDs of the sound acquisition devices may also be included in the correspondence relationship library.

Preferably, in sound acquisition step, a sound of each speaker is concentratedly collected via one sound acquisition device, and the collected sounds of different speakers are distinguished according to location information and/or sound ray information of the speakers. In addition, the above location information is stored for future use for other applications, such as 3D audio rendering et al. Preferably, the above location information may also be included in the correspondence relationship library.

Preferably, in sound acquisition step, a sound of each speaker is collected via sound acquisition devices, and sounds of different speakers are distinguished by performing a sound ray analysis on the collected sounds.

Preferably, the correspondence relationship further includes a second correspondence relationship between the complete sound and the scene features as well as sound elements. In correspondence relationship establishing step S203, the complete sound, the scene features and the sound elements as well as the second correspondence relationship are stored in association in the correspondence relationship library. In the generating step S205, the correspondence relationship library is searched for the complete sound or sound elements which are related to the reproduction scene feature according to the correspondence relationship, and the sound to be reproduced is generated using the found complete sound or sound elements. As an example, sounds or sound elements are found dynamically and intelligently from the correspondence relationship library. For example, in the case where there are multiple complete sounds or multiple combinations of sound elements which are related to reproduction scene feature in the correspondence relationship library, one complete sound is dynamically and intelligently selected from the multiple complete sounds, or one combination of sound elements is dynamically and intelligently selected from the multiple combinations of sound elements, and a sound to be reproduced is generated using the selected complete sound or combination of sound elements.

As an example, in correspondence relationship establishing step S203, the use of the sound elements and the scene features stored in the correspondence relationship library during the generation of the sound to be reproduced is periodically analyzed. If there are sound elements and scene features in the correspondence relationship library that are not used to generate a sound to be reproduced for a long time period, these sound elements and scene features are determined as invalid information, and thus the sound elements and scene features are deleted from the correspondence relationship library. For example, in correspondence relationship establishing step S203, the complete sound that is not used to generate a sound to be reproduced for a long time period is also deleted from the correspondence relationship library.

Preferably, the correspondence relationship further includes a third correspondence relationship between the ID information of the speaker uttering the sound and the scene features as well as the sound elements. In correspondence relationship establishing step S203, the ID information of the speaker is also stored in association with the scene features and the sound elements as well as the third correspondence relationship in the correspondence relationship library. In generating step S205, a speaker to which the found sound elements belong can be determined according to the third correspondence relationship between the ID information of the speaker and the scene features as well as the sound elements. Therefore, a sound to be reproduced including the complete sound or sound elements of the desired speaker can be generated.

Preferably, in generating step S205, in a case where the reproduction scene feature fully matches the scene feature in the correspondence relationship library, a complete sound which is related to the scene feature fully matching the reproduction scene feature is searched for, and the sound to be reproduced is generated using the found complete sound. The sound to be reproduced is generated using the found complete sound, thereby generating a sound that completely corresponds to the reproduction scene feature.

Preferably, in generating step S205, the found complete sound is added in a form of text or audio into a sound information library of an original speaker, and the sound to be reproduced is generated based on the sound information library, to render the sound to be reproduced according to a pronunciation sound ray of the original speaker, thereby increasing the flexibility of the commentary audio synthesis. In this way, in generating step S205, the found complete sound is added into the sound information library of the original speaker to continuously enrich and expand the sound information library of the original speaker.

Preferably, in generating step S205, a sound to be reproduced is generated using the found complete sound in the form of text or audio, to render the sound to be reproduced according to a pronunciation sound ray of a speaker uttering the found complete sound, thereby presenting the tone and rhythm of the found sounds as realistic as possible. In this way, in generating step S205, the found complete sound is directly stored as a voice file.

Preferably, in generating step S205, in a case where the reproduction scene feature does not fully match any of the scene features in the correspondence relationship library, sound elements related to scene features which respectively match respective portions of the reproduction scene feature are searched for, and the sound to be reproduced is generated by combining the found sound elements. A sound to be reproduced corresponding to the reproduction scene feature can be generated by combining the found sound elements related to the reproduction scene feature.

Preferably, in generating step S205, the found sound elements are added in a form of text or audio into a sound information library of an original speaker, and the sound to be reproduced is generated based on the sound information library, to render the sound to be reproduced according to a pronunciation sound ray of the original speaker, thereby increasing the flexibility of the commentary audio synthesis. In this way, in generating step S205, the found sound elements are added into the sound information library of the original speaker to continuously enrich and expand the sound information library of the original speaker.

Preferably, in generating step S205, a sound to be reproduced is generated using the found sound elements to render the sound to be reproduced according to a pronunciation sound ray of a speaker uttering the found sound elements, thereby increasing the participation sense of the speaker. In this way, in generating step S205, the combination of the found sound elements is directly stored as a voice file.

As an example, in a case where each part of the reproduction scene feature does not match any of the scene features in the correspondence relationship library, the sound elements which are related to the scene features in the correspondence relationship library having a high similarity with the reproduction scene feature can be selected according to the similarity degree between the reproduction scene feature and the scene features in the correspondence relationship library, to synthesize the sound to be reproduced.

Preferably, in generating step S205, the found complete sound or sound element can be added in a form of a sound barrage to the sound to generate a sound to be reproduced. As an example, in a case that collected information is not rich enough in an initial stage of collecting audio information of the player, the found complete of voice or sound element of the game player can be added in the form of a "sound barrage" to the original commentary audio, to form unique audio rendering. In this case, the original commentary audio remains unchanged, and only in certain scenes (such as, scores, fouls, showing red or yellow card et al.), the found complete voice or sound element of the game player is played in the form of "sound barrage" during the game, thereby enriching the forms for reproducing the audio commentary.

The sound to be reproduced generated according to the above processing may be played or reproduced immediately after being generated, or may be buffered for later playing or reproduction as needed.

Preferably, the information processing method 200 according to the embodiment of the present disclosure further includes a reproducing step. In the reproducing step, the sound to be reproduced is reproduced in a scenario containing the reproduction scene feature. As an example, in reproducing step, a real-time scene of a game can be analyzed in real time according to the original design logic of the game, and the sound to be reproduced (for example, the game commentary audio information file generated according to the above processing) is triggered in the scenario containing the reproduction scene feature. As the voice information collected in the sound acquisition step increases and enriches continuously, the design logic of the game can be continuously optimized to reproduce the more accurate and richer sounds to be reproduced (for example, the game commentary audio information file generated according to the above processing) that are generated according to the real-time scene of the game. Therefore, in reproducing step, the sound to be reproduced can be presented more user-friendly.

Preferably, in reproducing step, the sound to be reproduced may be rendered according to the pronunciation sound ray of the original speaker. Specifically, in reproducing step, the scene of the game can be analyzed in real time according to the original design logic of the game. In the case where the found sound element or the complete sound is added into the sound information library of the original speaker as described above in generating step S205, the sound to be reproduced is presented according to the pronunciation sound ray of the original speaker in reproducing step, so that the original commentary content information is continuously enriched and expanded, and the commentary content has personalized features. In addition, the addition of new sound elements and scene features into the correspondence relationship library changes or finely enriches the triggering logic and design of the original commentary audio of the game.

Preferably, in reproducing step, the sound to be reproduced is rendered according to the pronunciation sound ray of the speaker uttering the found sound elements or complete sound. Specifically, in the case where the combination of the found sound elements or the complete sound are stored directly as a voice file as described above in the generating step S205, the sound to be reproduced is reproduced according to the pronunciation sound ray of the speaker uttering the found sound element or complete sound in the reproducing step. For example, in the case where the sound elements or the complete voice of the game player is found, the game commentary audio can be presented according to the sound ray of player based on the original design logic of the game in combination with the real-time scene of the game. The increasing of sound elements and scene features increases the triggering of the game scene, so that the commentary audio information can be more accurately and vividly presented. In addition, the original commentary audio included in the game can be rendered with the sound ray of the game player, especially when the sound information of the player is not rich enough initially.

Preferably, the information processing method 200 according to the embodiment of the present disclosure further includes a communication step. In the communication step, communication with an external device or a network platform is performed in a wireless or wired manner to transmit information to the external device or the network platform. For example, in the communication step, the generated sound to be reproduced is transmitted in the form of a file to the network platform, thereby facilitating sharing between users.

The information processing method 200 according to the embodiment of the present disclosure is described above by assuming that an application scenario is a game platform, especially sports game (E-Sports). As an example, the information processing method 200 according to the embodiment of the present disclosure is also applicable to an application scenario of a live television sports contest. As an example, the information processing method 200 according to the embodiment of the present disclosure can realize "automatic realized aside" and playing in a documentary or other audio and video products with aside.

It should be noted that, although the function configuration and operation of the information processing apparatus and method according to the embodiments of the present disclosure is described above, which is merely exemplary rather than restrictive. Those skilled in the art can modify the above embodiments in accordance with principles of the present disclosure, for example, function modules and operations in each embodiment can be added, deleted, or combined, and such modifications each fall within the scope of the present disclosure.

In addition, it should be noted that, the method embodiments here correspond to the above-described apparatus embodiments. Therefore, for contents which are not described in detail in the method embodiments, one may refer to the corresponding description in the apparatus embodiments, and details are not repeated here.

Furthermore, a program product storing machine readable instruction codes is further provided according to the present disclosure. The method according to the embodiments of the present disclosure is executed when the instruction codes are read and executed by a machine.

Accordingly, a storage medium for carrying the program product storing the machine readable instruction codes is further included in the present disclosure. The storage medium includes but is not limited to a floppy disc, an optical disc, a magnetic optical disc, a memory card, and a memory stick.

In the case where the present disclosure is implemented by software or firmware, a program constituting the software is installed in a computer with a dedicated hardware structure (e.g. the general purpose computer 300 shown in FIG. 3) from a storage medium or a network. The computer is capable of implementing various functions when installed with various programs.

Figure 3:
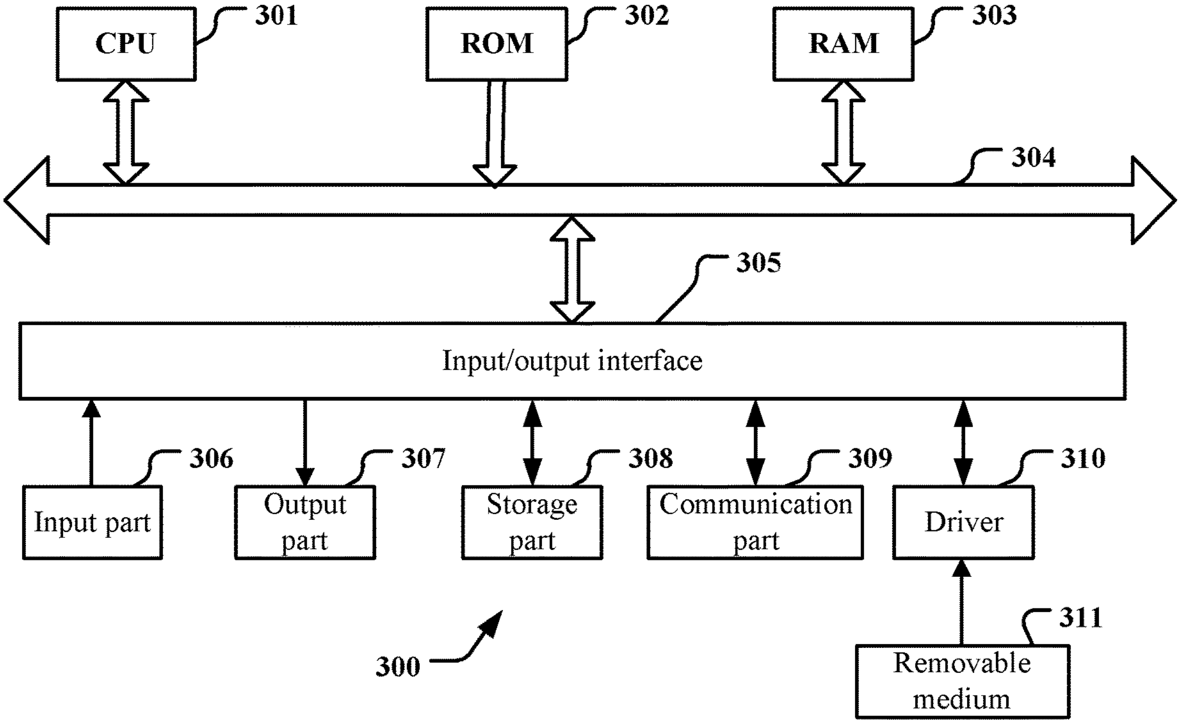
FIG. 3 is an exemplary block diagram illustrating a structure of a personal general purpose computer capable of implementing the method and/or apparatus according to the embodiments of the present disclosure.

In FIG. 3, a central processing unit (CPU) 301 executes various processing according to a program stored in a read-only memory (ROM) 302 or a program loaded to a random access memory (RAM) 303 from a storage part 308. The data required for the various processing of the CPU 301 may be stored in the RAM 303 as needed. The CPU 301, the ROM 302 and the RAM 303 are connected with each other via a bus 304. An input/output interface 305 is also connected to the bus 304.

The input/output interface 305 is connected with an input part 306 (including a keyboard, a mouse and so on), an output part 307 (including a display such as a Cathode Ray Tube (CRT) and a Liquid Crystal Present (LCD), a loudspeaker and so on), a storage part 308 (including a hard disk), and a communication part 309 (including a network interface card such as a LAN card, a modem and so on). The communication part 309 performs communication processing via a network such as the Internet. A driver 310 may also be connected to the input/output interface 305, if needed. A removable medium 311, such as a magnetic disk, an optical disk, a magnetic optical disk and a semiconductor memory, may be mounted on the driver 310 as required, so that the computer program read therefrom is mounted onto the storage part 308 as required.

In the case of implementing the series of processing above through software, the program consisting of the software is mounted from the network such as the Internet, or from the storage medium such as the removable medium 311.

It should be appreciated by those skilled in the art that the memory medium is not limited to the removable medium 311 shown in FIG. 3, which has a program stored therein and is distributed separately from the apparatus so as to provide the program to users. The example of the removable medium 311 includes magnetic disk (including soft disk (registered trademark)), optical disk (including compact disk read only memory (CD-ROM) and Digital Video Disk (DVD)), magnetic optical disk (including mini disk (MD) (registered trademark)), and semiconductor memory. Alternatively, the storage medium can be the ROM 302, the hard disk contained in the storage part 308 or the like. The program is stored in the storage medium, and the storage medium is distributed to the user together with the device containing the storage medium.

It should be noted that in the device and method of the present disclosure, the respective units or respective steps can be decomposed and/or recombined. These decomposition and/or recombination shall be considered as equivalents of the present disclosure. The steps for executing the above processes can be executed naturally in the description order in a chronological order, but are unnecessary to be executed in the chronological order. Some steps may be executed in parallel or independently from each other.

Figure 4:
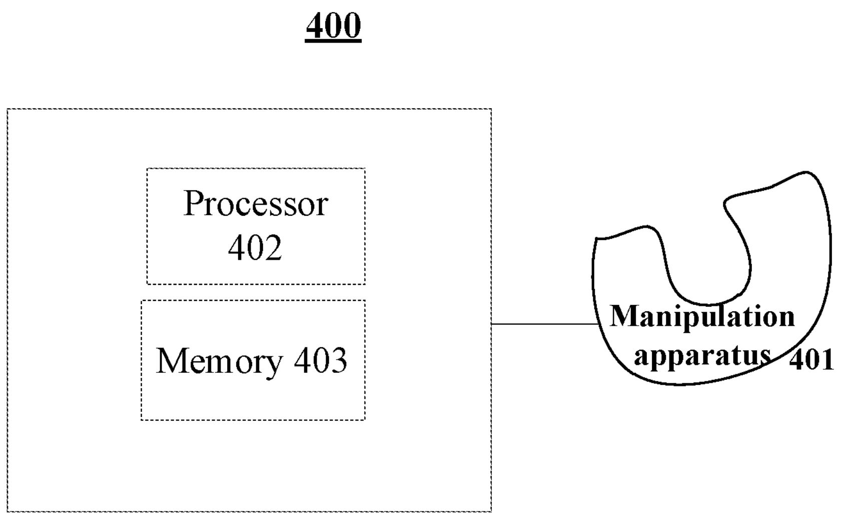
FIG. 4 schematically illustrates a block diagram of a structure of an information processing device according to an embodiment of the present disclosure.

In addition, an information processing device 400 capable of implementing the functions of the information processing apparatus according to the above embodiments of the present disclosure (for example, as shown in FIG. 1) is further provided according to the present disclosure. FIG. 4 schematically illustrates a block diagram of a structure of an information processing device 400 according to an embodiment of the present disclosure. As shown in FIG. 4, an information processing device 400 according to the present embodiment of the disclosure includes a manipulation apparatus 401, a process 402, and a memory 403. The manipulation apparatus 401 is used for a user to manipulate the information processing device 400. The processor 402 may be a central processing unit (CPU) or a graphics processing unit (GPU) or the like. The memory 403 includes instructions readable by the processor 402, and the instructions, when being read by the processor 402, cause the information processing device 400 to execute the processing of: selecting, from a sound, sound elements which are related to scene features during making of the sound; establishing a correspondence relationship including a first correspondence relationship between the scene features and the sound elements and between the respective sound elements, and storing the scene features and the sound elements as well as the correspondence relationship in association in a correspondence relationship library; and generating, based on reproduction scene feature and the correspondence relationship library, a sound to be reproduced. For an example in which the information processing device 400 performs the above processing, one may refer to the description in the above embodiment of the information processing apparatus (for example, as shown in FIG. 1), and details are not repeated here.

It should be noted that although the manipulation apparatus 401 is illustrated in FIG. 4 as being separate from the processor 402 and the memory 403 and connected to the processor 402 and the memory 403 via wires, the manipulation apparatus 401 may be integrated with the processor 402 and the memory 403.

In a specific embodiment, the above information processing device may be implemented, for example, as a game device. In the game device, the manipulation apparatus may be, for example, a wired game gamepad or a wireless game gamepad, and the game device is manipulated by the game gamepad.

The game device according to the present embodiment can generate a customized personalized game commentary based on the voice of the player stored in the correspondence relationship library, thereby solving the problem that the existing game commentary is single and monotonous.

During the operation of the game device, as an example, the memory, processor, and manipulation apparatus may be connected to the display device via a High Definition Multimedia Interface (HDMI) line. Display devices may be televisions, projectors, computer monitors, and the like. In addition, as an example, the game device according to the present embodiment may further include a power source, an input/output interface, an optical drive, and the like. Further, as an example, the game device may be implemented as a PlayStation (PS) gaming machine series. In this configuration scenario, the game device according to the embodiment of the present disclosure may further include a PlayStation Move (Leap Motion controller) or a PlayStation camera or the like for acquiring related information of a user (e.g., a game player), for example, a voice, video images of a user.

Finally, to be further noted, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Unless expressively limited, the statement "including a . . . " does not exclude the case that other similar elements can exist in the process, the method, the article or the device other than enumerated elements.

Although the embodiments of the present disclosure have been described in detail in combination with the drawings above, it should be understood that, the embodiments described above are only used to explain the present disclosure and are not constructed as the limitation to the present disclosure. Those skilled in the art can make various modifications and variations to the above embodiments without departing from the essence and scope of the present disclosure. Therefore, the scope of the present disclosure is defined by only the appended claims and equivalent meaning thereof.

The following configurations are further provided according to the present disclosure.

Solution (1). An information processing apparatus, comprising:

processing circuitry, configured to:

select, from a sound, sound elements which are related to scene features during making of the sound;

establish a correspondence relationship comprising a first correspondence relationship between the scene features and the sound elements and between the respective sound elements, and storing the scene features and the sound elements as well as the correspondence relationship in association in a correspondence relationship library; and generate, based on a reproduction scene feature and the correspondence relationship library, a sound to be reproduced.

Solution (2). The information processing apparatus according to Solution (1), wherein the correspondence relationship further comprises a second correspondence relationship between the sound and the scene features as well as the sound elements; and the processing circuitry is configured to:

store the sound in association with the scene features and the sound elements as well as the second correspondence relationship in the correspondence relationship library; and search the correspondence relationship library for sound or sound elements related to the reproduction scene feature according to the correspondence relationship, and generate the sound to be reproduced using the found sound or sound elements.

Solution (3). The information processing apparatus according to Solution (2), wherein the processing circuitry is configured to:

in a case where the reproduction scene feature fully matches the scene feature in the correspondence relationship library, search for a sound which is related to the scene feature fully matching the reproduction scene feature, and generate the sound to be reproduced using the found sound.

Solution (4). The information processing apparatus according to Solution (3), wherein the sound is voice of a speaker, and the processing circuitry is configured to:

add the found sound in a form of text or audio into a sound information library of an original speaker, and generate the sound to be reproduced based on the sound information library, to render the sound to be reproduced according to a pronunciation sound ray of the original speaker; or generate the sound to be reproduced using the found sound in a form of text or audio, to render the sound to be reproduced according to a pronunciation sound ray of a speaker uttering the found sound.

Solution (5). The information processing apparatus according to Solution (2), wherein the processing circuitry is configured to:

in a case where the reproduction scene feature does not fully match any of the scene features in the correspondence relationship library, search for sound elements related to scene features which respectively match respective portions of the reproduction scene feature, and generate the sound to be reproduced by combining the found sound elements.

Solution (6). The information processing apparatus according to Solution (5), wherein the sound is a voice of a speaker, and the processing circuitry is configured to:

add the found sound elements in a form of text or audio into a sound information library of an original speaker, and generate the sound to be reproduced based on the sound information library, to render the sound to be reproduced according to a pronunciation sound ray of the original speaker; or generate the sound to be reproduced using the found sound elements, to render the sound to be reproduced according to a pronunciation sound ray of a speaker uttering the found sound elements.

Solution (7). The information processing apparatus according to any one of Solutions (1) to (6), wherein the processing circuitry is configured to collect a sound of each speaker via sound acquisition devices which are respectively arranged corresponding to each speaker, and to distinguish collected sounds of different speakers according to IDs of the sound acquisition devices.

Solution (8). The information processing apparatus according to any one of Solutions (1) to (7), wherein the processing circuitry is configured to concentratedly collect a sound of each speaker via one sound acquisition device, and to distinguish collected sounds of different speakers according to location information and/or sound ray information of the speakers.

Solution (9). The information processing apparatus according to any one of Solutions (1) to (8), wherein the processing circuitry is configured to collect a sound of each speaker via sound acquisition devices, and to distinguish the sounds of different speakers by performing a sound ray analysis on the collected sound.

Solution (10). The information processing apparatus according to any one of Solutions (1) to (9), wherein the correspondence relationship further comprises a third correspondence relationship between ID information of the speaker uttering the sound and the scene features as well as the sound elements, and the processing circuitry is configured to store the ID information of the speaker in association with the scene features and the sound elements as well as the third correspondence relationship in the correspondence relationship library.

Solution (11). The information processing apparatus according to any one of Solutions (1) to (10), wherein the processing circuitry is configured to specify a correspondence between the sound elements and the scene features and between respective sound elements according to a predetermined rule, and update the predetermined rule in response to updating of the correspondence between the sound elements and the scene features, and the correspondence between the respective sound elements.

Solution (12). The information processing apparatus according to any one of Solutions (1) to (11), wherein the sound elements comprise information for describing the scene features and/or information for expressing an emotion, the information for expressing the emotion comprising a tone of a sound and/or a rhythm of a sound.

Solution (13). The information processing apparatus according to any one of Solutions (1), (2), (3), and (5), wherein the sound comprises at least one of applause, acclaim, cheer, and music.

Solution (14). The information processing apparatus according to (2), wherein the processing circuitry is configured to add the found sound or sound elements in a form of a sound barrage to the sound, to generate the sound to be reproduced.

Solution (15). The information processing apparatus according to any one of Solutions (1) to (14), wherein the processing circuitry is configured to delete, from the correspondence relationship library, sound elements and scene features that are not used to generate the sound to be reproduced for a long time period.

Solution (16). The information processing apparatus according to any one of Solutions (1) to (15), wherein the processing circuitry is configured to reproduce the sound to be reproduced in a scenario containing the reproduction scene feature.

Solution (17). The information processing apparatus according to any one of Solutions (1) to (16), wherein the processing circuitry is configured to communicate with an external device or a network platform in a wireless or wired manner to transfer information to the external device or the network platform.

Solution (18). The information processing apparatus according to Solution (8), wherein the location information is used for performing 3D audio rendering.

Solution (19). The information processing apparatus according to Solution (2), wherein the sound or the sound elements are found dynamically and intelligently from the correspondence relationship library.

Solution (20). An information processing method, comprising:

selecting, from a sound, sound elements which are related to scene features during making of the sound;

establishing a correspondence relationship comprising a first correspondence relationship between the scene features and the sound elements and between the respective sound elements, and storing the scene features and the sound elements as well as the correspondence relationship in association in a correspondence relationship library; and generating, based on a reproduction scene feature and the correspondence relationship library, a sound to be reproduced.

Solution (21). A computer readable storage medium, storing computer executable instructions that, when being executed, execute a method comprising:

selecting, from a sound, sound elements which are related to scene features during making of the sound;

establishing a correspondence relationship comprising a first correspondence relationship between the scene features and the sound elements and between the respective sound elements, and storing the scene features and the sound elements as well as the correspondence relationship in association in a correspondence relationship library; and generating, based on a reproduction scene feature and the correspondence relationship library, a sound to be reproduced.

Solution (22). An information processing device, comprising:

a manipulation apparatus for a user to manipulate the information processing device;

a processor; and a memory comprising instructions readable by the processor, and the instructions, when being read by the processor, causing the information processing device to execute the processing of:

selecting, from a sound, sound elements which are related to scene features during making of the sound;

establishing a correspondence relationship comprising a first correspondence relationship between the scene features and the sound elements and between the respective sound elements, and storing the scene features and the sound elements as well as the correspondence relationship in association in a correspondence relationship library; and generating, based on a reproduction scene feature and the correspondence relationship library, a sound to be reproduced.

The invention claimed is:

1. An information processing apparatus for playing a video game, comprising:

processing circuitry configured to:

control actions of the video game based on user inputs and prestored information;

select, from a sound, sound elements which are related to scene features of the video game during making of the sound, wherein the scene features comprise a game action, the game action being one of a library of actions that may be performed by one or more of the at least two players while playing the video game;

establish one or more correspondence relationships between the scene features of the video game and the sound elements, and store, in a correspondence relationship library, the scene features of the video game and the sound elements as well as the one or more correspondence relationships; and based on a reproduction of the scene feature occurring while playing the video game, access the correspondence relationship library in order to generate and reproduce the sound in association with the reproduction of the scene feature, wherein the processing circuitry is configured to:

record voice recordings of one or more spoken sounds of the at east two players, prior to starting the video game via sound acquisition devices which are respectively arranged corresponding to each of the at least two players, and distinguish collected sounds of the at least two players according to IDs of the sound acquisition devices or according to pronunciation sound rays of the at least two players, wherein the generated and reproduced sound that is based on the reproduction of the scene feature occurring while playing the video game comprises at least one of the voice recordings rendered according to the pronunciation sound rays of the at least two players.

2. The information processing apparatus according to claim 1, wherein the processing circuitry is configured to:

determine whether the reproduction scene feature fully matches the scene feature in the correspondence relationship library;

in a case where the reproduction scene feature fully matches the scene feature in the correspondence relationship library, search for a sound which is related to the scene feature fully matching the reproduction scene feature, and generate the sound to be reproduced using the found sound; and in a case where the reproduction scene feature does not fully match any of the scene features of the video game in the correspondence relationship library, search for sound elements related to scene features of the video game which respectively match respective portions of the reproduction scene feature, and generate the sound to be reproduced by combining the found sound elements.

3. The information processing apparatus according to claim 1, wherein the generated and reproduced sound further comprises at least one of a prestored applause, acclaim, cheer, or music.

4. The information processing apparatus of claim 1, wherein the scene features comprise the game action and player names respectively selected or input by at least two players of the video game, wherein the one or more correspondence relationships are between the (1) the scene features of the video game and the sound elements and (2) between the sound elements, and the collected sounds are distinguished between the collected sounds of the at least two players according to IDs of the sound acquisition devices and according to pronunciation sound rays of the at least two players.

5. An information processing method pert med by an information processing apparatus for playing a video game and that includes a processor, the method comprising:

controlling actions of the video game based on user inputs and prestored information;

selecting, from a sound, sound elements which are related to scene features of the video game during making of the sound;

wherein the scene features comprise a game action, the game action being one of a library of actions that may be performed by one or more of the at least two players while playing the video game;

establishing one or more correspondence relationships between the scene features of the video game and the sound elements, and store, in a correspondence relationship library, the scene features of the video game and the sound elements as well as the one or more correspondence relationships; and based on a reproduction of the scene feature occurring while playing the video game, accessing the correspondence relationship library in order to generate and reproduce the sound in association with the reproduction of the scene feature, wherein the method further comprises:

recording voice recordings of one or more spoken sounds of the at least two players, prior to starting the video game via sound acquisition devices which are respectively arranged corresponding to each of the at least two players, and distinguishing collected sounds of the at least two players according to IDs of the sound acquisition devices or according to pronunciation sound rays of the at least two players, wherein the generated and reproduced sound that is based on the reproduction of the scene feature occurring while playing the video game comprises at least one of the voice recordings rendered according to the pronunciation sound rays of the at least two players.

6. The information method of claim 5, wherein the scene features comprise the game action and player names respectively selected or input by at least two players of the video game, wherein the one or more correspondence relationships are between the (1) the scene features of the video game and the sound elements and (2) between the sound elements, and the collected sounds are distinguished between the collected sounds of the at least two players according to IDs of the sound acquisition devices and according to pronunciation sound rays of the at least two players.

7. A non-transitory computer-readable storage medium, storing computer-executable instructions that, when being executed, cause an information processing apparatus for playing a video game to execute a method comprising:

controlling actions of the video game based on user inputs and prestored information;

selecting, from a sound, sound elements which are related to scene features of the video game during making of the sound;

wherein the scene features comprise a game action, the game action being one of a library of actions that may be performed by one or more of the at least two players while playing the video game;

establishing one or more correspondence relationships between the scene features of the video game and the sound elements, and store, in a correspondence relationship library, the scene features of the video game and the sound elements as well as the one or more correspondence relationships; and based on a reproduction of the scene feature occurring while playing the video game, accessing the correspondence relationship library in order to generate and reproduce the sound in association with the reproduction of the scene feature, wherein the method further comprises:

recording voice recordings of one or more spoken sounds of the at least two players, prior to starting the video game via sound acquisition devices which are respectively arranged corresponding to each of the at least two players, and distinguishing collected sounds of the at least two players according to IDs of the sound acquisition devices or according to pronunciation sound rays of the at least two players, wherein the generated and reproduced sound that is based on the reproduction of the scene feature occurring while playing the video game comprises at least one of the voice recordings rendered according to the pronunciation sound rays of the at least two players.

8. The non-transitory computer-readable storage medium of claim 7, wherein the scene features comprise the game action and player names respectively selected or input by at least two players of the video game, wherein the one or more correspondence relationships are between the (1) the scene features of the video game and the sound elements and (2) between the sound elements, and the collected sounds are distinguished between the collected sounds of the at least two players according to IDs of the sound acquisition devices and according to pronunciation sound rays of the at least two players.

9. An information processing device for playing a video game, comprising:

a manipulation apparatus for a user to manipulate the information processing device in order to play the video game;

a processor; and a memory comprising instructions readable by the processor, and the instructions, when being read by the processor, causing the information processing device to execute the processing of:

controlling actions of the video game based on user inputs and prestored information;

selecting, from a sound, sound elements which are related to scene features of the video game during making of the sound;

wherein the scene features comprise a game action, the came action being one of a library of actions that may be performed by one or more of the at least two players while playing the video game;

establishing one or more correspondence relationships between the scent features of the video game and the sound elements, and store, in a correspondence relationship library, the scene features of the video game and the sound elements as well as the one or more correspondence relationships; and based on a reproduction of the scene feature occurring while playing the video game, accessing the correspondence relationship library in order to generate and reproduce the sound in association with the reproduction of the scene feature, wherein the method further comprises:

recording voice recordings of one or more spoken sounds of the at least two players, prior to starting the video game via sound acquisition devices which are respectively arranged corresponding to each of the at least two players, and distinguishing collected sounds of the at least two players according to IDs of the sound acquisition devices or according to pronunciation sound rays of the at least two players, wherein the generated and reproduced sound that is based on the reproduction of the scene feature occurring while playing the video game comprises at least one of the voice recordings rendered according to the pronunciation sound rays of the at least two players.

10. The information processing device of claim 9, wherein the scene features comprise the game action and player names respectively selected or input by at least two players of the video game, wherein the one or more correspondence relationships are between the (1) the scene features of the video game and the sound elements and (2) between the sound elements, and the collected sounds are distinguished between the collected sounds of the at least two players according to IDs of the sound acquisition devices and according to pronunciation sound rays of the at least two players.

* * * * *